United States Patent
Washburn

(10) Patent No.: US 9,868,652 B1
(45) Date of Patent: Jan. 16, 2018

(54) OIL-SKIMMING TUBE WITH STIFFENING INSERT MEMBER

(71) Applicant: Oil Skimmers, Inc., North Royalton, OH (US)

(72) Inventor: Robert B Washburn, Amherst, OH (US)

(73) Assignee: OIL SKIMMERS, INC., North Royalton, OH (US)

( * ) Notice: Subject to any disclaimer, the term of this patent is extended or adjusted under 35 U.S.C. 154(b) by 64 days.

(21) Appl. No.: 14/952,014

(22) Filed: Nov. 25, 2015

Related U.S. Application Data

(60) Provisional application No. 62/084,031, filed on Nov. 25, 2014.

(51) Int. Cl.
| | | |
|---|---|---|
| *C02F 1/40* | (2006.01) | |
| *F16F 1/04* | (2006.01) | |
| *F16L 11/10* | (2006.01) | |
| *E02B 15/10* | (2006.01) | |
| *F16F 1/02* | (2006.01) | |
| *C02F 101/32* | (2006.01) | |
| *C02F 103/00* | (2006.01) | |

(52) U.S. Cl.
CPC ............... *C02F 1/40* (2013.01); *E02B 15/10* (2013.01); *E02B 15/104* (2013.01); *F16F 1/025* (2013.01); *F16L 11/10* (2013.01); *C02F 2101/32* (2013.01); *C02F 2103/007* (2013.01)

(58) Field of Classification Search
CPC ..... B01D 17/0214; C02F 1/40; E02B 15/104; F16L 11/10; F16L 57/02; F16F 1/025; F16F 1/04; F16F 1/08; F16F 3/04

USPC ......... 210/242.3, 526, 776; 428/36.9, 36.91; 138/118, 118.1, 153, 172; 267/166, 267/166.1, 168, 180, 288, 289, 290
See application file for complete search history.

(56) References Cited

U.S. PATENT DOCUMENTS

| | | | | |
|---|---|---|---|---|
| 2,048,744 | A * | 7/1936 | Janes ..................... | B60R 19/52 267/180 |
| 2,254,566 | A * | 9/1941 | Cornell, Jr. .............. | F16D 3/72 267/180 |
| 2,640,502 | A * | 6/1953 | Powers ................... | F16L 57/02 138/103 |
| 3,508,663 | A * | 4/1970 | Brill ...................... | E02B 15/102 210/924 |
| 3,640,394 | A * | 2/1972 | Brill ...................... | E02B 15/042 210/526 |
| 3,709,369 | A * | 1/1973 | Brill ...................... | E02B 15/042 210/924 |
| 4,420,016 | A * | 12/1983 | Nichols .................. | F16L 3/003 138/172 |
| 5,164,083 | A * | 11/1992 | Ahrendt ................ | E02B 15/104 210/242.3 |
| 6,455,117 | B1 * | 9/2002 | Margucci .............. | A47G 7/041 428/36.91 |

(Continued)

FOREIGN PATENT DOCUMENTS

DE            2027542     * 6/1971

*Primary Examiner* — Christopher Upton
(74) *Attorney, Agent, or Firm* — Medley, Behrens & Lewis, LLC

(57) ABSTRACT

A flexible thermoplastic tube having a stiffening member installed inside is described herein. Mechanisms to couple both the stiffening member and outer tube are also described. The stiffened tube is particularly useful in oil skimming equipment for remediation of hydrocarbons in containment pools.

16 Claims, 8 Drawing Sheets

(56) References Cited

U.S. PATENT DOCUMENTS

| | | | |
|---|---|---|---|
| 6,962,659 B2 * | 11/2005 | Rhein | B01D 17/0214 210/242.3 |
| 2006/0081303 A1 * | 4/2006 | Coleman | F16L 57/02 138/153 |
| 2007/0262500 A1 * | 11/2007 | Tubbs | F16F 1/08 267/166.1 |
| 2009/0194186 A1 * | 8/2009 | Gross | F16L 57/02 138/172 |

* cited by examiner

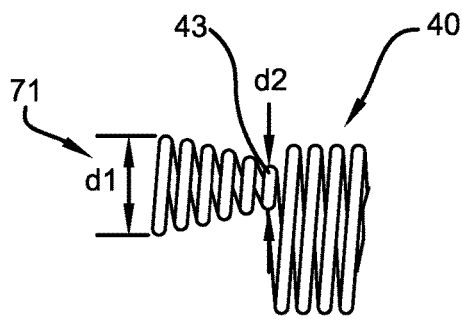
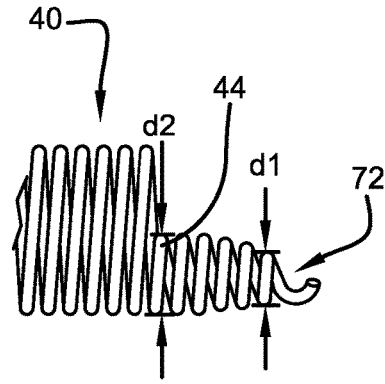
FIG. 7  FIG. 8
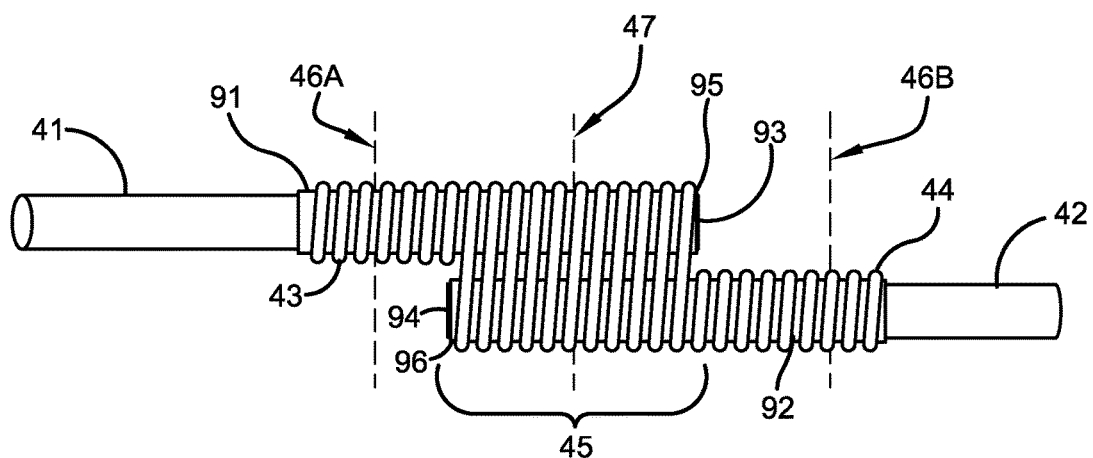
FIG. 9

OIL-SKIMMING TUBE WITH STIFFENING INSERT MEMBER

CROSS-REFERENCE TO RELATED APPLICATIONS

This application claims the benefit of U.S. Provisional Application No. 62/084,031, filed Nov. 25, 2014.

FIELD

This disclosure relates to a tubular member for use in oil-skimming equipment.

BACKGROUND AND SUMMARY

Flexible plastic tubes are used by a variety of industries to internally convey gasses, liquids, solids or suspensions. There are applications in petroleum, chemical, manufacturing, other industries in which a tubular member's outer surface is used as a means to physically collect (by adsorption) and transfer media from one location to another. An example of this application would be in the skimming of oils, greases, hydrocarbons or other floating non-dissolved solids from the surface of water in a contaminated reservoir. In this application, the collection tube is joined into a long continuous loop, the loop is moved into and out of the pool in a continuous circular path by a mechanical drive system, and the solids and adsorbed hydrocarbon liquids accumulated on the surface of the tube loop are scraped off and collected at the machine before the loop is sent back into the pool. Joining the tube geometry in this type of application are disk-shaped geometries, and looped belt skimmers. However, these latter two configurations are limited in their ability to collect contaminants from large pools due to the fixed nature of their deployment, and the fact that the floating residue to be removed from their surfaces must migrate to the skimmer. Collection tubes in tube skimmers, on the other hand, float on the surface, and by doing so, advantageously migrate over a large area of the pool, vastly increasing the rate by which the pool surface may be cleaned.

Suitable tube materials, by design, should exhibit a high relative degree of flexibility, such that they can easily enter and exit the pool surface from a vertical orientation, and be drawn around positioning pulleys and drive wheels having relatively small radii, such as, for example, less than 25 times the diameter of the tube, 3 to 12 times the diameter of the tube, or 10 to 15 times the diameter of the tube. In short, they should behave similarly to a loosely woven rope, but unlike a rope, a tube's surface is smooth and continuous, and lends itself readily to scraping devices, which are employed to remove the adsorbed contaminants from the tube surface.

A problem exists in that the longer the length of flexible tube floating on the pool surface, the greater the tendency for the tube to flip over itself and entangle. Furthermore, the tube may at times loop up with floating debris. Longer length loops, then, tend to entangle and pull down into knot bundles. These knot bundles then jam the machine entrance and can result in tube or machine breakage. Consequently, tube lengths are sized and cut shorter than would otherwise be desired for many applications. This problem diminishes one of the greatest differentiating qualities of tube skimmers—their ability to float out over substantially all the surface area of the entire pool.

Guide pulleys or posts can be installed to encourage the tube to go out over a larger surface area. However, these are difficult to install and service, and are subject to abrasion and wear.

Compounding the difficulty of solutions in this field are the temperature variations and environmental contaminants that occur in a given outdoor containment pool. Issues with thermal expansion and temperature-related stiffness variation present challenges with selecting tube materials. Various contaminants, such as tree branches, and other rubbish can exacerbate problems with entanglement.

An article of manufacture disclosed herein includes: a tube comprising an elongated, hollow structure, having an inner surface bounding a hollow portion of the tube, and an outer surface defining an exterior surface of the tube; and an elongated stiffening member disposed within the hollow portion of the tube, and extending the length of the tube. The stiffening member has a stiffness of at least 0.5 times that of the tube. The tube is configured to be joined in a looped configuration.

An oil skimmer system disclosed herein includes: a mechanical drive system configured to drive a tube in a continuous loop, and a scraper configured to skim an outer surface of the tube. The tube comprises an elongated, hollow structure, having an inner surface bounding a hollow portion of the tube, and an outer surface defining an exterior surface of the tube. An elongated stiffening member is disposed within the hollow portion of the tube that extends the length of the tube. The stiffening member has a stiffness at least 0.5 times that of the tube. The tube is joined in a looped configuration.

A hollow, spiral wound spring body disclosed herein includes a slideable side and a fixed side, the slideable side and the fixed side each coupled to a mid-section. The slideable side has an inner diameter defining a first inner diameter cross-sectional area; and the fixed side has an inner diameter defining a second inner diameter cross-sectional area. The mid-section comprises an inner diameter cross-sectional area that at least equals a sum of the first and second inner diameter cross-sectional areas.

The articles "a," "an," and "the" should be interpreted to mean "one or more" unless the context clearly indicates the contrary.

The term "set" as used herein, should be interpreted to mean a set with at least one member, and not an empty set, unless the context clearly indicates the contrary.

BRIEF DESCRIPTION OF DRAWINGS

FIG. 7 is a partial perspective view of an example spring coupling slideable end.

FIG. 8 is a partial perspective view of an example spring coupling fixed end.

FIG. 9 is a perspective view of an example spring coupling with sleeve inserts with stiffening member ends coupled therein.

DETAILED DESCRIPTION

Figure 1A:
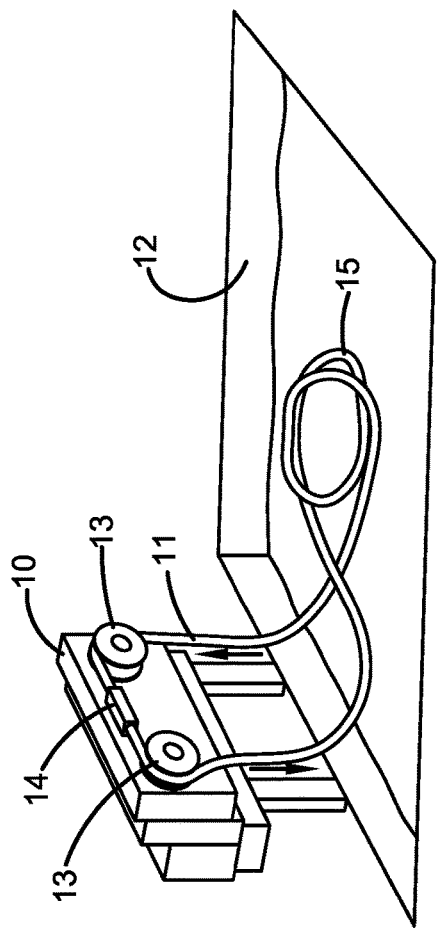
FIG. 1A is a perspective view of an example tube skimmer with a flexible tube without an internal stiffening member overlapping itself.

In an embodiment described herein, a stiffened tube includes an internal stiffening member that can be inserted inside the stiffened tube prior to joining the tube into a loop. The internal stiffening member is allowed to move independently within the tube. In this way, controlled flexible bending of the tube can still be accomplished within defined limits, whereas the internal stiffening member has the ability to resist tight coil formation, entanglements and knotting. The internal stiffener has the ability to "open" the loop up to its maximum extension by a low force nudging against the internal wall, thus extending the traverse of the loop over the pool surface. For gradual bends in the loop, there is very little mechanical interaction between the insert and the inner wall of the tube. As the tube undergoes tighter bending; however, the resistance to bending in the stiffening member and the stiffened tube as a whole becomes proportionally greater. This effect not only limits the tendency for small entangling loops to form, but precludes their ability to form into a knot—instead, they simply pull out again as the tube moves about the pool surface.

As used herein, a "tube" or "tubular member," is an elongated, hollow structure that has an axis extending along the elongated direction of the member and a radius extending out from axis. An inner surface of the member defines interior surface of the tube, which bounds the hollow portion of the tube. An outer surface defines the exterior surface of the tube. The tube may be in the shape of a cylinder, i.e. having a circular cross-section, but is not limited to a circular cross-section. In an example, the cross-section may be square, triangular, trapezoidal, rectangular, or polygonal. A tube may be in a looped configuration when the ends of the tube are joined to form a continuous member. A central axial member of a rope-mop can also be considered a tube. In an embodiment, tubular members that are stents, antennas, toys, or that convey fluids are excluded.

Flexible elements such as solid rubber tubes or rods will continue to pull down into tighter and tighter knots if loaded in tension. A plot of the load required to deform a flexible rod in cantilever bending, shows the load/deformation relationship is such that less load is required to induce greater deformation. This relation is even greater for a tubular article because as the tube is bent, the forces induce ovalization of the cross-section, and as the ovalization progresses, the load required for further deformation is reduced significantly. Typically, the tubular profile will continue to ovalize at an accelerating rate until buckling occurs—the buckled, or kinked, profile, then, offers little or no resistance to further loading. Thus, if one were to form the tube in a loose knot loop, the application of a tension to the free ends would result in an increasing rate of deformation followed by a rapid reduction in knot loop diameter. Furthermore, since the kink has changed the reactance to tension, if the tension is removed, the knot is fixed and cannot recover, unless it is forced apart.

Stiffening members, may be chosen on the basis of their high stiffness and resistance to bending, but only occupy a portion of the tubes available free space. In other words, the stiffening member should be able to move around freely inside the tube. The value that this provides is that in the present application, the tube loop is desired to be semi-flexible such that it may be free to move about the pool surface, and flexible enough to bend about the machine pulley radii without mechanical damage to the tube or the stiffening insert. As the tube with stiffening member (stiffened tube), acting as a mechanical couple, is bent into tighter and tighter angles, the stiffening member begins to offer growing resistance to the bending force. This means that unlike the situation where bending an empty tube results in an unchecked deformation and kinking, the mechanical couple demonstrates flexibility at first, but then growing resistance to bending. It has been found that this greatly discourages the tendency for knot formation.

FIG. 1A depicts an example configuration of an oil skimmer 10 and collector tube 11 on the surface of an example containment pool 12. The oil skimmer 10 is generically depicted as the stiffened tubes described herein may be used in pre-existing oil skimming machinery. Generally, the oil skimmer 10 includes pulleys 13 coupled to a motor that drives the collector tube 11 onto the water surface and back up into the oil skimmer 10, where a scraper 14 is configured to remove oil or other contaminants from the tube and dispose of it appropriately. Tube loop-overs are shown at 15, where the tube 11 has flipped back over itself and formed loops which lead to potential entanglement situations.

Collection tubes are often formed of thermoplastic elastomers, and as such, they have a tendency to undergo "cold flow" under a sustained load, such as that of coil packaging. In this case, instead of having a tube that remains flexible when laid out, keeping the same position of flotation over its length in the pool, the cold flow property of the thermoplastic will induce a helix to form, making the behavior of the tube unmanageable and more serpentine in its path. This effect encourages the formation of entanglements.

In addition, the tube has a limited range of stiffness due to the small radii it passes through to run through the scraper and to bend at a sufficient angle to transition from the vertical alignment over the water (to pass through the scraper) to a horizontal alignment on the surface of the water. An overly stiff plastic tube will not pass through the scraper spools efficiently, and will plunge deeply into the pool before the buoyancy of the tube causes the stiff tube to bend upward and lay on the surface.

Figure 1B:
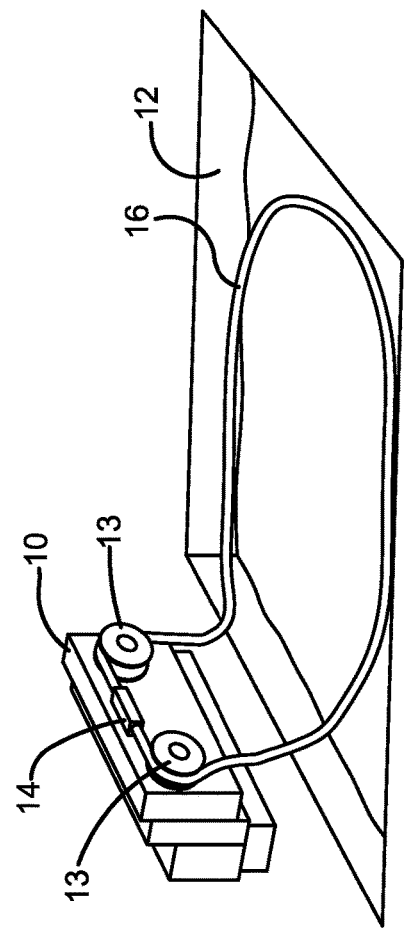
FIG. 1B is a perspective view of an example tube skimmer with a flexible tube containing an internal stiffening member, the view illustrates the effect the insert has on opening the overlapping arrangement of the tube.

FIG. 1B shows a stiffened tube 16 that includes a stiffening member insert as described herein. FIG. 1B shows an example of the influence the stiffened tube has on preventing and opening loop-overs. In addition to resisting loop-overs, the tube loop now has greater extension out into the pool.

In the technology disclosed herein, the tube and stiffening member have cross-sectional dimensions that allow for the stiffening member to move about inside the free space within the inner diameter of the tube. This creates a condition of relative flexibility so long as the tube remains within a certain limiting radius of curvature. Under no external load conditions, the tube will be motivated to open up fully by the gentle push of the internal member. As the internal member is forced into a tighter bend, it will generate a proportionally greater resistance to bending. The free space between the tube inner surface and the rigid member outer surface allows for some delay in the interaction between these two elements. This provides a stiffened tube that can be relatively flexible at low degrees of bending, but may increase significantly when loaded into higher degrees of curvature. In this way, the tube may be drawn up and over the skimming machine without a great deal of resistance, but will tend to resist formation of entanglements and loops that otherwise form naturally due to the tubes internal stresses. Furthermore, if loops do form, the stiffness element will act to resist the pulling down of such a loop into a knot, and will act to push back out of the loop formation once the pulling forces are removed.

In an embodiment of the technology disclosed herein, the tube is extruded from a thermoplastic elastomer or vulcanizable rubber. Elastomers may be selected from those based on polyurethane, ethylene-propylene, polyolefin blends, copolyesters, or polyamides. In another embodiment, the tube may be comprised of extrudable and cross-linkable rubber compounds, such as, for example, silicones, polybutadiene, polychloroprene, chlorinated polyethylene, ethylene-propylene-diene (EPDM), chloro-sulfonated polyethylene and the like. The choice of material is largely relevant to its mechanical and chemical performance, such that it behaves flexibly, with good tensile strength and creep resistance, adsorbs hydrocarbons floating on water (has a hydrophobic and/or oleophilic quality), and possesses resistance to the variable chemistries floating on the water as contaminants. In general, a material would be selected to have good resistance to hydrocarbons and fatty acids and other oils, which may be found on the surface of the containment pool. Additional material selection factors may be based on broad chemical resistance, mechanical performance, abrasion resistance, and price.

In another embodiment, the tube may be extruded from semi-flexible thermoplastic foam, such as a polyolefin foam, which would rely on the added flexibility offered by the thin walls of the foam. Although not as mechanically robust as the elastomer approach suggested above, the polyolefin foam does provide the advantage of improved solvent resistance of polyethylenes and polypropylenes without loss of flexibility.

Tube cross-sectional size may range, for example, from 0.25 inches to 4 inches, such as 0.5 inches to 3 inches, or 1 inch to 2 inches in outer diameter, and have an inner diameter ranging from ⅛ inch to 1.75 inches. The tube may have an outer diameter to wall thickness ratio of 5 to 20, such as, for example, 8 to 12, or 6 to 9. Tube length may be greater than conventional lengths in some embodiments, because of activity of the stiffening member prevents entanglements and loop-overs. Lengths will vary according to the size of the containment pool and the distance to the skimming unit, but may, for example, be 10 to 250 ft., such as 150 to 200 ft., or 30 to 100 ft.

In contrast to an empty tube that merely has a stiffened cross-section or a stiffer material, a tube with a stiffening member disposed in the hollow portion of the tube has an independent effect on the bending characteristics of the tube, due to the fact the stiffening member has a degree of freedom of bending within the tube before it exerts a force on the inner surface of the tube.

In an embodiment, the stiffening member is chosen from metals, thermoplastics and thermosetting composites. In addition, a selection of a cross-sectional geometry of the stiffening member can impart a balance between stiffness in one or multiple planes, high stiffness to weight ratio designs, connectivity, and potential multiple functionality. Cross-sectional configurations of the stiffening member include geometries such as, for example: a cylindrical solid, cylindrical hollow (tubular), polygonal solid (e.g. square or rectangular), polygonal hollow (tubular), cross, star, or multi-fin.

Figure 2:
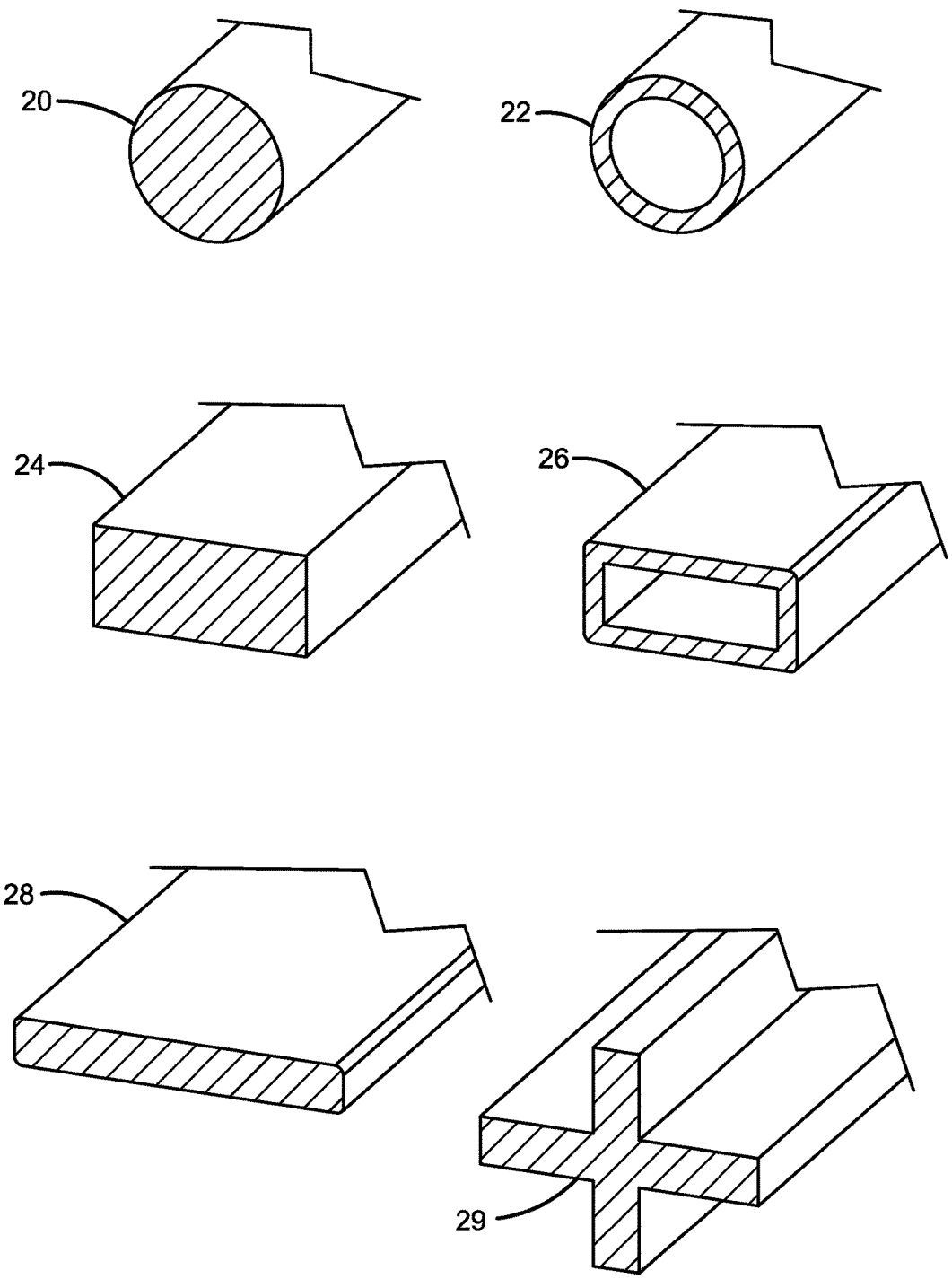
FIG. 2 is a cross-sectional perspective view showing example insert profiles for stiffening rods.

FIG. 2 illustrates several example cross-sections that may be used for the stiffening member. For reasons of cost and availability, a round, solid cross-section 20 is readily available from a number of sources and typically exhibits uniform bending properties. Tubular profiles 22 would provide similar stiffness, but at a lower weight per foot, which has advantages for buoyancy. Other cross-sections are shown including, rectangular 24, hollow rectangular 26, band or flattened rectangular 28, and cross 29. Any of the cross-sections mentioned above may have rounded edges to decrease friction and wear on the internal surface of the tube. For example, a rectangular cross-section includes a cross-section that is rectangular with rounded edges.

In an embodiment, the following factors are considered for the design of the stiffening member. The size of the stiffener is chosen relative to its ability to physically straighten the outer tube, without binding or deforming the tube, and generally promoting the gentle opening of the tube to its fullest loop diameter. From a practical comparison, the resistance to cantilever bending of the stiffener should be from ½ to 2 times the stiffness exhibited by the tube at the same length. In an embodiment the stiffening member should have a stiffness, at a minimum that is greater than the stiffness of the tube. Additionally, to resist knot formation, the stiffening member should be at a minimum from 3 to 5 times, such as 3.5 to 4.5 times as resistant to bending as the tube at higher degrees of curvature, i.e. at the degree just prior to "kinking" or failure.

Figure 12:
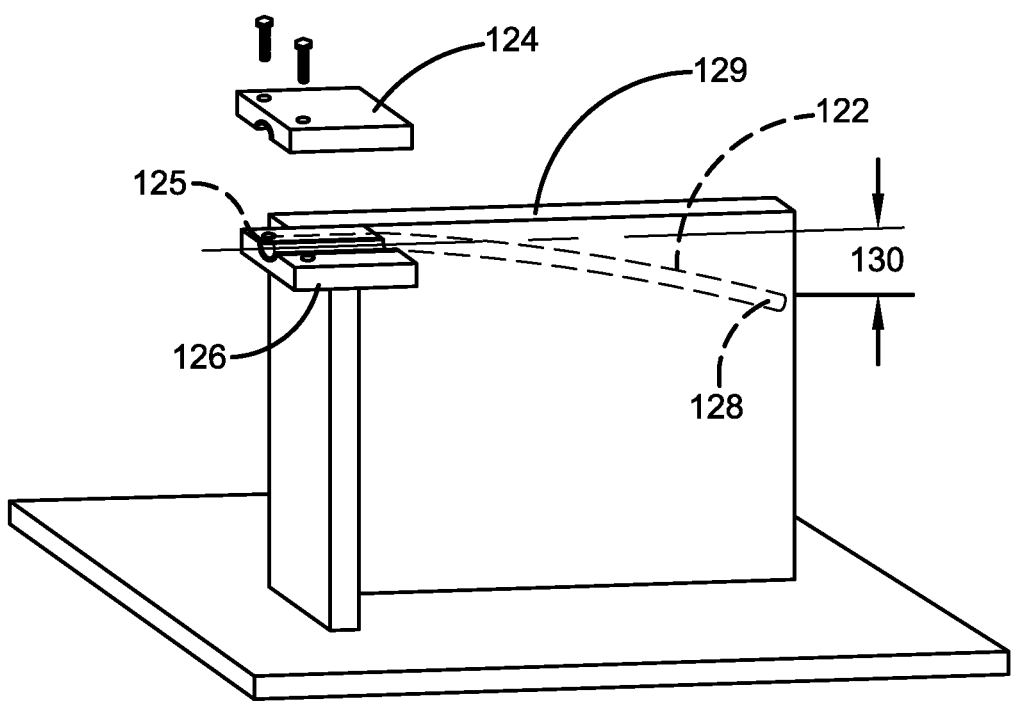
FIG. 12 is an illustration of a cantilever bending test method.

This resistance to bending of the tube, stiffening member, or stiffened tube, and the relationship between the stiffening member and the tube, may be best evaluated based on the cantilever test shown in FIG. 12. Other standardized tests do not fully characterize the properties of tubular materials when bending, because as the parameters of the cross-section of an elongated member changes, the bending characteristics and subtle relationships between the tube and the stiffening insert will change. The cantilever test, includes a tube, stiffening member, or stiffened tube 122 that is clamped with a clamping member 124 at a first end 125 on an elevated platform 126. The distance that the tube deflects at the second end 128 may be measured by determining the distance between the first end 125 and the second end 128. This can be aided by a guide member 129 on the test instrument that runs alongside the tube, stiffening member, or stiffened tube 122 at the same height as the top of the first end 125 of the tube. In such case the distance 130 between the top of the second end 128 and the top of the guide member 129 can be readily measured. The lengths of the tube, stiffening member, or stiffened tube 122 to be compared should be the same for accurate comparisons. The length selected for testing, may, for example, be 1 ft, 5 ft., or 10 ft. Stiffness in the cantilever test can be measured with only gravity or it can be measured with an additional load added to the second end 128, but the additional load should be the same in both comparators.

There are limits to how stiff the insert can be, such that the behavior of the mechanical couple no longer meets the minimum level of flexibility which allows reasonable transitions from the vertical to that of the horizontal orientation of the pool, and where the flexural stresses on the stiff member, and its loading of the inner tube wall, are too great to reliably cycle through the pulley and drive rollers without undue fatigue and wear. With this in mind, as guidance, the stiff member should not typically exceed the stiffness of the tube by more than 10 times, such as, for example, 5 to 9 times, or 6 to 8 times. As mentioned above, this stiffness comparison is best done by the cantilever test. In a filled thermoplastic example, the stiffening member, has an elastic modulus greater than 200,000 psi, such as 300,000 to 1,000,000 psi, 400,000 to 800,000 psi, or 450,000 to 600,000 psi. In an example that does not include "continuous" glass, aramid or carbon fiber, the flex modulus may range up to 1.5 million psi, such as 700,000 to 1.25 million psi, or 800,000 to 1 million psi. In an example comprising fiberglass reinforced plastic rods with thermosetting resin binders with up to 75% glass content by weight, the flex modulus may range up to 7 million psi, such as 2 million to 5 million psi, or 3 million to 4 million psi.

It should be noted that as the stiffening member continues to bend to a tighter radius, the relationship between bending forces has much to do with section modulus, meaning the larger the perpendicular distance from the longitudinal beam axis, the greater the stiffness. The tube has a much larger sectional area at the beginning than the stiffening member, but because it is elastic, it stretches and distorts by comparison. Thus at low levels of bending the tube may seem as stiff or even stiffer than the rod, but when bent further, it undergoes an elliptical narrowing of the cross-sectional area, thus becoming much less resistant to bending—and ultimately distorted to the point of kinking. In an embodiment, the stiffening member, is less elastic than the tube and does not exhibit as much cross-sectional distortion.

The cross-section should match the material stiffness with its geometry in such a way so as to reduce the weight per unit length while maximizing the resistance to flexure. The stiffening member should have a cross-section that is substantially smaller than the inside diameter of the tube that is being modified, in at least one dimension. For example, the stiffening member may have a band shaped cross-section that is 10% to 90%, such as 30% to 75%, or 40% to 65% of the diameter of the hollow portion of the tube in one dimension and 1% to 30%, such as 2% to 25%, or 5% to 20% of the diameter of the hollow portion of the tube in another dimension. These ranges may be used for other cross-sections in one or more dimensions. The stiffening member may comprise a composite that is effectively creep resistant under the loads represented by the service conditions. In an embodiment, the combination of high stiffness and small cross-section synergistically provides the effect of resisting knot formation and providing excellent buoyancy and sufficient flexibility for being drawn across small radii.

In an embodiment, the stiffening member should be free to slide and adjust its position within the tube without binding. In an embodiment, to allow for this feature it is effective to have a 30% to 55% fill of the tube ID in at least one dimension, e.g. the major transverse dimension of the cross-section of the stiffening member, such as 35% to 50%, or 38% to 45%. For example, this suggests that for a nominal 0.75 inch tube having an ID on the order of 0.5 inches, the stiffening member should have an effective OD no greater than 0.25 inches (not taking into account any accompanying connector device).

Materials for the stiffening member may be selected based on properties desired for a given application. These include linear weight (so as not to negatively affect the buoyancy of the tube), stiffness, and stiffness memory (having resistance to creep or cold-flow). Example materials include some spring metal forms, linearly-reinforced thermoplastic extruded profiles and pultruded thermosetting composites based on continuous fibers.

In an embodiment, a metal material is used for the stiffening member. Metals can be inexpensive and creep resistant, though consideration should be given to their added weight and permanent deformation characteristics. In an embodiment, a thin-walled tube with a light-weight metal, such as aluminum or titanium, and alloys of these metals may be used. In an embodiment, the metal will have a high modulus and a small cross-section to reduce weight and prevent permanent deformation.

In some embodiments a thick-cross-sectional profile tends to over-strain when being taken about the machine pulleys and drive wheels of an oil skimmer, resulting in permanent deformations. However, a stiffening member with a flat cross-section will have flexibility in one plane and not in the other. With such a profile, a balance of weight and stiffness in the bendable plane should be tailored per the application, taking account of factors such as buoyancy and size of the tube, the size of pool and the environmental challenges (temperature change and amount of debris).

In an embodiment, the stiffening member is made of a thermoplastic material. Many thermoplastics will suffer from the packaging creep (cold-flow) mentioned above. This deficiency may include selection of thermoplastics with high modulus, such as, for example, high temperature materials, such as polyimides, polyether-ether-ketones, polyphenylene-sulfide and/or a polymer selected from those having highly aromatic, sterically restrictive polymer backbones, such as, polyarenes, bis-phenols, unsaturated hydrocarbons, polymers that form hydrogen bonds, para-phenylenes, benzobisoxazoles or benzobisthiazoles. These may be extruded unfilled or combined with linear reinforcements that boost the compound modulus. These composites would be appropriate on the basis of both weight and creep resistance. Unfortunately, such materials tend to be expensive and difficult to get in custom profiles due to the complexity of their processing. Of these materials, a specific example is a continuous fiber-reinforced polyamide (such as nylon 6-6)—based on glass, polyaramid fiber, or carbon fibers. These materials may, for example, have a tensile modulus of, for example, 10 to 12 million psi (glass); 12-18 million psi (polyaramid); 30-35 million psi (carbon fiber). In an example, materials are used that have a low processing viscosity and can be highly filled (high glass content), and/or also have hydrogen bonding to produce a stiffer backbone (the shorter the carbon chain length between amid linkages, the stiffer and stronger the composite).

In an embodiment, the stiffening member is made of a thermosetting resin, such as, for example, epoxy, polyester, polyacrylic, methyl-methacrylate. In an embodiment, these resins are cross-linked and have a high stiffness. In an embodiment, the thermosetting resin is a low viscosity liquid at room temperature, and can be filled with a high amount of linear reinforcement material, such as, for example, glass fiber (e.g. chopped fiber), continuous glass, carbon, aramid, or thermoplastic fibers. Amounts of linear reinforcement materials may, for example, range from 20% to 90% by mass of the resin, such as 40% to 80%, or 60% to 75%.

In an embodiment, the thermosetting resin and linear reinforcement elements combine to form fiberglass composites, or more particularly, pultruded fiberglass profiles. The resulting stiffness and memory retention of these profiles is excellent and because of their high fill ratio, the linear weight is highly dependent on the reinforcement, which, for glass fibers is about 2.55 to about 2.65 kg/m3 specific gravity. Because of the high stiffness, very little material needs to be used in the cross-section, to obtain a suitable resistance to bending.

In an embodiment, the stiffening member is a pultruded composite rod, about 0.08 inches in diameter, comprised of about 70% by mass of a continuous glass fiber in a thermosetting polyester resin binder. More generally, a rod diameter of, for example, 0.005 inches to 1 inch in diameter, such as 0.01 inches to 0.25 inches, 0.05 to 0.125 inches, or 0.08 inches to 0.098 inches may be used depending on the application. The same diameter ranges are also applicable to the largest dimension of other cross-sections, such as a flattened rectangle, oval, or cross shape.

Although the descriptions above have dwelled predominantly on the form of a smooth wall collector tube loop, there are other forms of floating collection devices that would also benefit from these teachings. In particular, linear mop-type constructions exist that are comprised of a central axial strength member not unlike a rope. Nested and intertwined between the windings of the core are transverse strings, strips, fibers, (or any of a number of linear elements of varying lengths) which form the "linear mop." Similar to the tube, the mop construction generally has lower specific gravity and floats on the pool surface. Tubes have a smooth surface which lends itself to effective scraping with a curved scraping element to remove the acquired oil and debris, whereas, mop-ropes must be "wrung out" through opposing rollers, similar to a wringer. Mop-ropes, similar to collector tubes, tend to loop over themselves and entangle because of their similar flexibility.

In an embodiment, a central stiffening member could provide similar mechanical benefits to mop type flexible skimming technology. When fitted with an inserted stiffening member, a hollow central axial member of a rope-mop can also be considered a tube. Flexible collector tubes and rope-mop constructions are just two of the typical floating collection devices. There are other designs such as a hollow rope that can benefit from the controlled flexibility offered by the application of an inserted stiffening element as described in herein.

In an embodiment, the tube is manufactured and the stiffening member is inserted within the tube, both the tube and stiffening member are then joined in a loop configuration. There are a number of ways to join the flexible tube, including fusion bonding, gluing, or mechanical couplings. Mechanical couplings generally contribute a bulky profile to the tube, and as a result, cause resistance or get in the way of the scraping device. However, a short low profile mechanical sleeve, may be crimped on, or includes a mechanical locking method such as barbs, tabs or threads may be used. Gluing can be effective if used in conjunction with an inner plug (or sleeve) that spans both ends of the tube (in this case the joint failure would be in lap shear as opposed to tensile). However, the stiffening member should be relatively matched with the thermal expansion coefficient of the outer tube. Fusion bonding generally results in one of the strongest bonds between the tube ends, and does not rely on any internal plug or appliance to support the union. By this means, the greatest amount of free space can be available to the insert.

There is a challenge in joining the tube simultaneously with the stiffening member inside the tube. Furthermore, the rigidity of the stiffening member makes for a difficult union.

In an embodiment, the free ends of the stiffening member are joined or mechanically restrained from bending out of the loop axis. Failure to do so may cause a tendency of the ends to push into the inner tube wall, resulting in abrasion and possibly penetration. If the ends are left free they may act as the ends of a lever, such that the forces applied together to the tube at the insert interface could induce buckling of the tube wall. This disadvantage of leaving the ends loose may be accounted for by other engineering adjustments, so it should not be construed to be a limitation of all embodiments.

In an embodiment, the stiffening member is joined by a rigid cylinder either by gluing or crimping (or by possible fusion bonding in the case of thermoplastic constructions). However, in some embodiments, it should be noted that the difference in thermal expansion between the stiffening member and flexible tube will be, for example, 1.1 times to 20 times, 2 times to 10 times or 5 times to 15 times higher in the more flexible tube than the stiffening member. Thus, over an operational temperature range, such as, for example, −20° F. to 120° F. or −10° F. to 100° F. the rigidly joined insert may either be too long or too short relative to the length of the outer flexible tube. Having a difference in lengths will result in sidewall forces (sidewall forces meaning forces applied by the stiffening member perpendicular to the longitudinal axis of the stiffening member and normal to the tube) from the stiffening member acting on the tube wall, causing a helix to form in the loop.

Accordingly, in an embodiment, the stiffening member is joined in a loop configuration in a manner such that it still moves independently of the outer tube, yet has its free ends constrained from diverting from the central axis of the tube, i.e. pushing it into a helix.

In an embodiment, a flexible tubular metal coupling, just slightly larger in diameter than the stiffening member, and substantially clear of the inner wall of the tube, is used to allow the two ends of the stiffening member to reside and move axially freely, yet be mechanically restrained from any lateral movement. The two ends of the stiffening member may be entered into a constraining, but flexible coupling. The coupling may have a resistance to bending that matches the stiffening member's resistance to bending. In an embodiment, the coupling's resistance to bending is, for example, within 40%, 20%, or 10% of the resistance to bending of the stiffening member. In absolute terms the stiffness of the coupling can be derived from the ranges expressed for the stiffening member above. In an embodiment where there is an excess of this flexible coupling spanning both ends of the flexible tube (i.e. overlapping), the outer flexible tube is free to close the space over the insert joint.

For the mechanical coupling embodiment, the coupling should allow free bending to the radial limits of the mechanical pulleys and drive rolls of the oil skimmer machinery, which are typically greater than a 2 inch radius, such as 2.5 to 48 inches or 6 to 12 inches. The coupling should be able to undergo bending of this nature well over 1 million cycles and not deform or break. The coupling should be able to capture the free ends of the stiff members without allowing them to protrude laterally from the tube axis.

Another feature available when using a metallic member for the coupling, in an otherwise dielectric tube and stiffening member, is the ability to sense its presence and absence through metal proximity sensors. The ability to sense the presence or absence of the tube is useful as it provides the operator with the ability to determine if the tube has stopped moving due to a jam, or has broken. With this indication, the machine can automatically shut itself down without creating a damaging situation, and an alarm can alert the operator so as not to run into unplanned downtime.

Figure 3A:
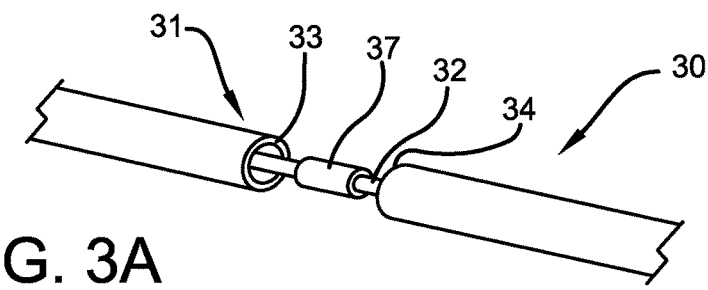
FIG. 3A is a perspective view showing an example tube, stiffening member, and their assembly with a coupling.
Figure 3B:
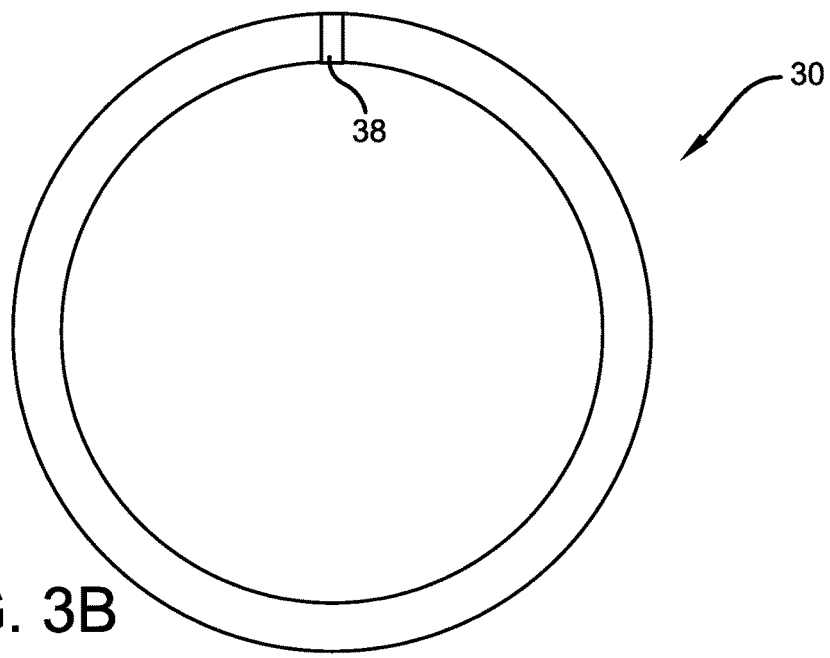
FIG. 3B is a partial cross-sectional view showing an example tube, stiffening member, and their assembly with a coupling.

For further illustration, FIG. 3A shows a cut-away view of a stiffened collector tube assembly 30 that includes a flexible collector tube 31 and a stiffening member 32. The tube 31 has a two free ends 33, 34. The stiffening member 32 is shown joined with a coupling 37. Once the stiffening member 32 has been coupled, the free tube ends 33, 34 can be joined at a joint 38 to form a loop configuration (FIG. 3B).

Figure 3C:
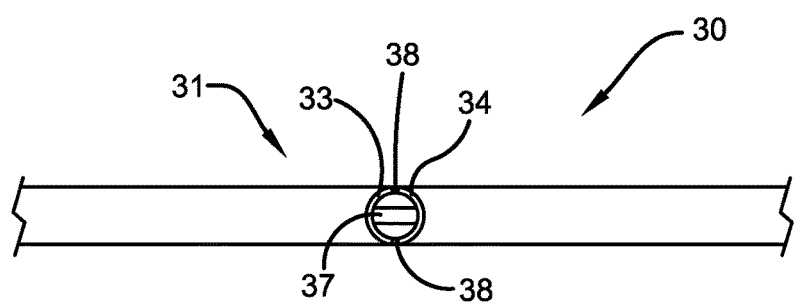
FIG. 3C is a cross-sectional view showing an example tube, stiffening member, and their assembly with a coupling.

As shown in FIG. 3C, the stiffened collector tube 30 is thus comprised of a flexible collector tube 31 having a stiffening insert 32 (not shown) that is joined by a coupling 37. The flexible collector tube 31 has been joined by heating and fusing the free ends 33, 34 to form a joint 38.

Figure 3D:
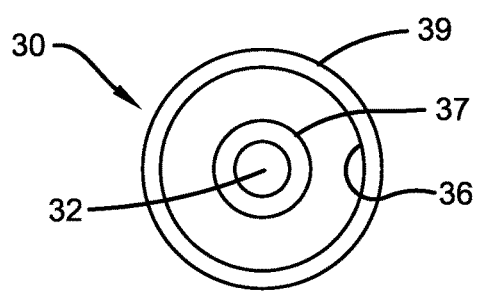
FIG. 3D is a perspective view of an example assembled tube with a stiffening member inside.

FIG. 3D shows a cross-section of the joined stiffened collector tube 30 at the joint 38. The coupling 37 is shown as holding the stiffening member 32. In this example, both the coupling 37 and the stiffening member 32 are cylindrical in shape. The collector tube 31 has an inner surface 36 which bounds the hollow portion of the collector tube 31. An outer surface 39 defines the exterior surface of the collector tube 31.

In an embodiment, the stiffening member 32 may be joined by first fixing the first free end inside the coupling 37 with an adhesive, and then inserting the second free end into the coupling 37, allowing sufficient space between the inner diameter of the coupling and the outer diameter of the stiffening member to insure free sliding movement. The length of the coupling 37 can be adjusted to allow for linear expansion due to changes in temperature In an embodiment, prior to assembly, the free end faces 31, 34 of the collector tube 31 are heated by contact with a heater plate, and once having done so, the free end of the stiffening member 32 is immediately engaged with the coupling sleeve 37 and the molten tube ends 31, 34 pushed together with sufficient force to comingle the molten material and establish a uniform, continuous joint 38 upon cooling. Once the joint 38 has cooled and developed strength the action of the stiffening member 32 can be observed to open up the loop configuration of the collector tube assembly 30 by action of the stiffening member 32 against the inner surface 36 of the collector tube 31.

If sufficient space exists between the outside diameter of the flexible coupling and the inner diameter of the tube, a glue plug may be considered for joining the tube. The glue plug or other mechanical/adhesive joints may also be used to hold the coupling in the desired alignment with the tube joint, since the coupling has shown a tendency to migrate in tube in the opposite direction from the direction revolution. If there is not enough space, the opposing faces of the flexible tube may be joined using conventional fusion techniques which allow for a split heater. In either event, a flexible tube loop is formed having an axially rigid insert installed inside.

In an embodiment, it may be advantageous to force the two ends of the stiffening member into a slideable coupling that has a stiffness that substantially matches material of the stiffening member. This, however, may require an element having higher strength and rigidity that holds the two free ends in close proximity to each other, but does not bind them together with such force that would restrict the relative slideable movements. The binding force required to bring the two ends together can be reduced in intensity if it can be spread out over a sufficient length, as opposed to a simple end-joined loop.

In an embodiment, a solution to this is a hollow, wound spiral spring coupling that is so designed to allow each member end (and limited adjacent length) to lay side by side within a mid-section of the coupling. Furthermore, the spring stock is chosen such that its tensile strength is greater than the forces of separation created by bending the two rigid members. In addition, a spring that is long, flexible, and strong in the transverse plane can spread the bending moment forces over a greater area. It is highly flexible so as to allow for millions of bending cycles. It is also low-profile in nature, so as to not bind or restrict the free movement of the rigid loop within the outer tube (profile).

The spring coupling can be installed by first fixing it permanently to one free end of the rigid member, and simply sliding the other free end into the adjacent channel during the assembly process of the outer tube. Because the spring is flexible, it can be supplied in much longer lengths than a rigid coupling. This makes the assembly process and measurement process much easier, as there is less chance for the free end of the rigid member to slide out of the coupling.

Figure 4:
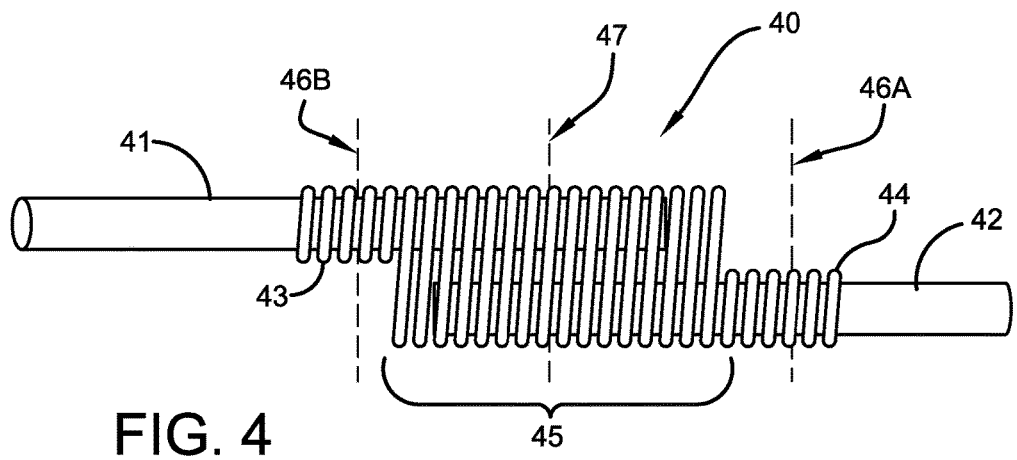
FIG. 4 is a perspective view of an example spring coupling with stiffening member ends coupled therein.

FIG. 4 illustrates a particular embodiment of the spring coupling. The spring coupling 40 having an elongated (generally oval) outer cross-sectional shape is depicted adjoining first and second ends 41, 42 of a stiffening member. The term "generally oval" includes any oval or stretched circular shape. The spring coupling 40 includes a slideable side 43 and a fixed side 44 that are each coupled to a mid-section 45 between them.

In an embodiment, the slideable side 43 is not tightly matched to the dimensions of the first end 41 of the stiffening member, for example, the inner diameter of the slideable side 43 may be greater than 0.5% percent, such as from 1% to 10%, or 2% to 5%, of the outer diameter of the first end 41.

In an embodiment, the fixed side 44 is tightly matched to the dimensions of the second end 42 of the stiffening member, for example, the inner diameter of the fixed side 44 may be within 1 percent or less of the outer diameter of the second end 42, such as between 0.1% to the same diameter of the second end 42, or even between 1% greater than to 0.01% less than the diameter of the second end 42. The fixed side 44 may be bonded to the second end 42 with an adhesive, such as a liquid or hot melt adhesive.

In an embodiment, the fixed side may have the same diameter as the slideable side 43, but the second end 44 of the stiffening member has a cap imparting a greater diameter to the second end 44 that causes it to be held in the fixed side 44. Alternatively, the fixed side 44 may be affixed to the second end 42 with an adhesive, spot weld, mechanical connection, or tape.

In an embodiment, a mid-section 45 of the spring coupling 40, is open to both sides in the middle. In the mid-section 45, the first and second ends 41, 42 overlap and reinforce the stiffness of the coupling 40. In an embodiment, the first and second ends 41, 42 are free to contact each other in the mid-section 45. In an alternative, the mid-section 45 may include a divider, e.g. alternating spring loops may only go around one side, as opposed to both sides of the coupling 40.

Figures 5, 6:
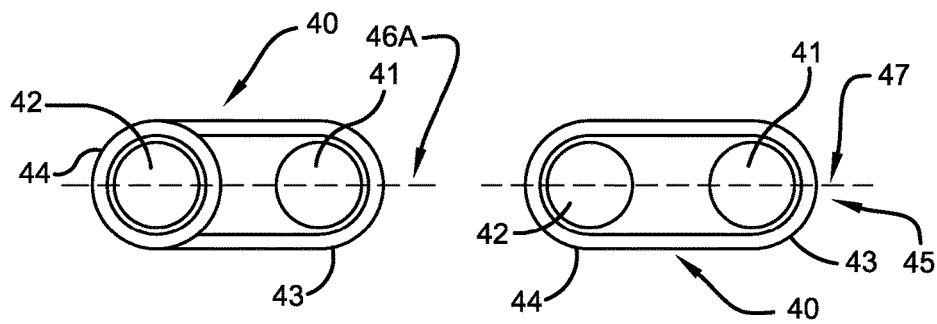
FIGS. 5 and 6 are cross-sectional views of the example spring coupling with the stiffening member ends coupled therein.

FIG. 5 illustrates a partial cross-section through the axis designated as 46 on FIG. 4, where the slideable side 43 is shown on the right and is behind the fixed side 44.

FIG. 6 illustrates a cross-section through the axis designated as 47 on FIG. 4 at the mid-section 45, where the slideable side 43 is shown on the right and the fixed side 44 is on the left.

Figure 6A:
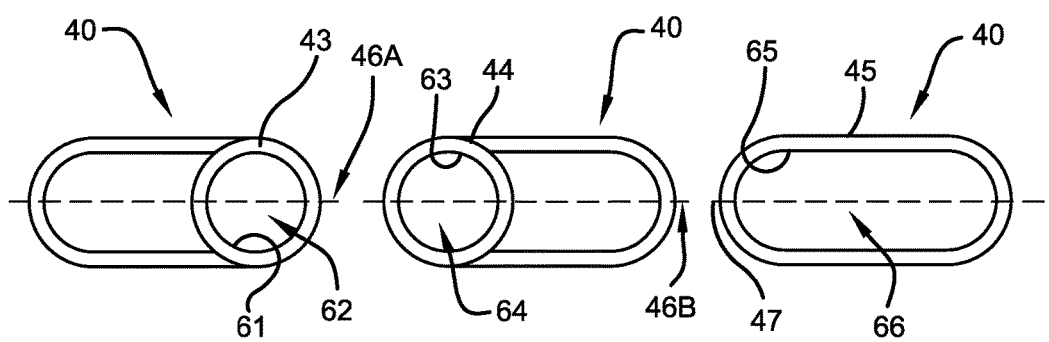
FIG. 6A are three cross-sectional views of the example spring coupling without the stiffening member ends coupled therein.

FIG. 6A shows cross-sections of a slideable side 43 with an inner perimeter 61 defining a first inner perimeter cross-sectional area 62. The fixed side 44 has an inner perimeter 63 defining a second inner perimeter cross-sectional area 64. The mid-section 45 also has an inner perimeter 65 defining a third inner perimeter cross-sectional area 66. The third inner perimeter cross-sectional area 66 of the mid-section 45 has an area that at least equals a sum of the first and second inner diameter cross-sectional areas.

FIG. 7 illustrates an embodiment of the spring coupling 40 with a broadening tapered opening 71 on the slideable side 43. The broadening tapered opening 71 allows for easier insertion and assembly of the first end 41 into the spring coupling 40. The broadening tapered opening 71 has an end diameter (d1) at the edge of the coupling 40 that is greater than the diameter (d2) at the spring loop just before the mid-section 45. In an embodiment, the diameter d1 is 10% to 100% greater than d2, such as 15% to 50%, or 25% to 35%.

FIG. 8 shows an embodiment of the spring coupling 40 with a narrowing tapered opening 72 on the fixed side 44. The narrowing tapered opening 72 provides a tighter fit and grasp on the second end 42 of the stiffening member that is joined by the coupling 40. The narrowing tapered opening 72 has an end diameter (d1) at the edge of the coupling 40 that is less than the diameter (d2) at the spring loop just before the mid-section 45. In an embodiment, the diameter d1 is 1% to 50% less than d2, such as 5% to 35%, or 10% to 25%.

The material and dimensions of the coupling, including the spring coupling 40, should be strong enough to keep two ends 41, 42, from inducing a bending moment that would significantly distort the smooth arc formed along the circumferential axis of the loop of the tube. A significant distortion may vary in different applications, but may be, for example greater than 10 degrees, 20 degrees, or 45 degrees from the arc of the tube, and may for example, produce a situation such that one or both free ends of the rods have either pushed through the spring windings, or the windings are spaced too far apart, or are not strong enough to resist the deforming action of the rod.

FIG. 9 shows an embodiment with a low-friction material sleeve insert 91 inside the slideable side 43 of the coupling 40. The low-friction material sleeve insert 91 may comprise or be coated on the inside with materials such as Teflon, HDPE (hi-density polyethylene), polypropylene, polyamide, or silicone impregnated HDPE, polypropylene, or polyamide. The sleeve insert 91 may be secured to the coupling 40 by adhesive or by mechanical means, e.g. a loop of the spring.

FIG. 9 also shows as part of the same embodiment an adhesive sleeve insert 92 inside the fixed side 44 of the coupling 40. Though depicted as part of the same embodiment, the low-friction material sleeve insert 91 need not be used in conjunction with the adhesive sleeve insert 92. The adhesive sleeve insert 92 can be used to provide a greater surface area for adhesively bonding the second end 42 of the stiffening member. The adhesive sleeve insert 92 may be secured to the coupling 40 by adhesive or by mechanical means, e.g. a loop of the spring. In an embodiment the sleeves 91, 92 can have an open or a closed end 93, 94 and may comprise a lip 95, 96 at the end 91, 92 to aid in mechanically retaining the sleeves 91, 92 in the coupling 40.

The sleeves 91, 92 should be made of a suitably flexible material to be compatible with the flexibility of the coupling 40. In an embodiment, the sleeves 91, 92 may be adhered together.

In another embodiment, the inner spring surfaces could be coated with a low-friction material, rather than using a separate sleeve. Alternatively, the stiffening member could be coated with a low friction material on the first end 41 that engages the slideable side 43.

In an embodiment, the fixed and slideable sides 43, 44 of the spring coupling 40 each have a length that is at least 5 diameter lengths of the stiffening member to be retained therein with additional space to allow for thermal expansion, which will vary according to material used and length of the stiffening member. An additional length to allow for tolerances and assembly error may also be added. Example lengths of each side 43, 44 are 5 to 100 diameter lengths of the stiffening member, such as 8 to 20, or 10 to 15. The overall length of the spring coupling 40 is based on the forces anticipated by the flexural modulus of the stiffening member. To this end, an example length for certain applications may be 0.5 to 10 inches, such as 1 to 8 inches, or 2 inches to 6 inches for the stiffened tubes used for oil skimming purposes described herein.

The spring coupling 40 may have loops that are spaced or not spaced apart. In an embodiment, the spring is metal and may be comprised of a wire diameter gauge of from 32 to 14, such as 28 to 20, or 18 to 16.

The spring coupling 40 can be manufactured by winding on a CNC wire form machine allowing the profile to be formed as an oval (the mid-section 45) that can accommodate the two rigid ends, and the two end sections can be wound round to accommodate only one end.

In an embodiment, the spring coupling 40 is durable and allows for millions of flex cycles, bending to a radius of less than 15 times the diameter of the spring coupling 40. It also has a small profile that allows for free movement within the inner diameter of the tube. The spring coupling 40 also allows for easy assembly of the two rigid ends 41, 42 of the stiffening member when they are already inserted inside a tube. The spring coupling 40 can have other cross-sections other than strictly round or strictly oval, but should have edges substantially complimentary to the inner surface of the tube, so as not to induce significant abrasion to the inner surface of the tube.

In an embodiment, the stiffened tube (the rigid stiffening member insert plus the outer collector tube) is a hydrocarbon collector tube that has limited flexibility, such that it will enter and exit a containment pool at a reasonable angle, such as about 90 degrees, such as 80 to 100 degrees, or 85 to 95 degrees. The stiffened tube should remain flexible on the surface of the water such that its buoyancy and flexibility allow it to layout evenly with the liquid surface. The stiffened tube should exhibit the natural force of extension provided by the stiffening member to "straighten" itself out, thus opening the tube to its largest diameter. This enables the stiffened tube to resist the tendency for tube over-lapping and formation of smaller loops and resist the ability of any formed small loops to be pulled down into a knot. The stiffened tube should still be suitably flexible so as to be easily directed about machine pulleys and drive wheels without undue mechanical resistance or fatigue.

The stiffened tube design provides controlled flexibility and allows tubes of substantially any length to be used on a pool without cause for entanglement and knot formation. In an embodiment, the stiffened tube may range in size from 10 to 250 ft., such as 150 to 200 ft., or 30 to 100 ft. This is dependent partly on the anticipated floating length of the tube and the distance from the water to the skimming unit. The ability to have longer tubes on the surface, then, allows the tube to reach further regions of the pool surface, which in turn increases proportionally the efficiency and effectiveness of the skimming operation, thus allowing higher rates of contamination removal and water purification. Having the means to keep the tube from kinking and tangling unexpectedly indicates that the tube length can be extended by an order of magnitude.

EXAMPLES

Example 1

In an embodiment, a collector tube is a 0.75 inch outer diameter tube having an inner diameter of 0.5 inches. The collector tube is comprised of a thermoplastic urethane elastomer. Prior to assembly, the tube had exhibited coil memory from being packaged in a coil, and laying the tube out freely would have resulted in a soft helical configuration. The action of the insert was observed as being strong and stiff enough to counteract the thermoplastic memory forces and "push" the tube into a circular configuration.

Examples 2-4

To demonstrate these effects, two fiberglass rods were evaluated against an empty tube. The tube was the same in all cases (the tube of Example 1). The Example 2 tube, as the control, was empty of any insert. The only difference was the insertion of a 0.080 inch diameter fiberglass rod in the Example 3 tube and a 0.125 inch diameter rod in the Example 4 tube.

Figure 10:
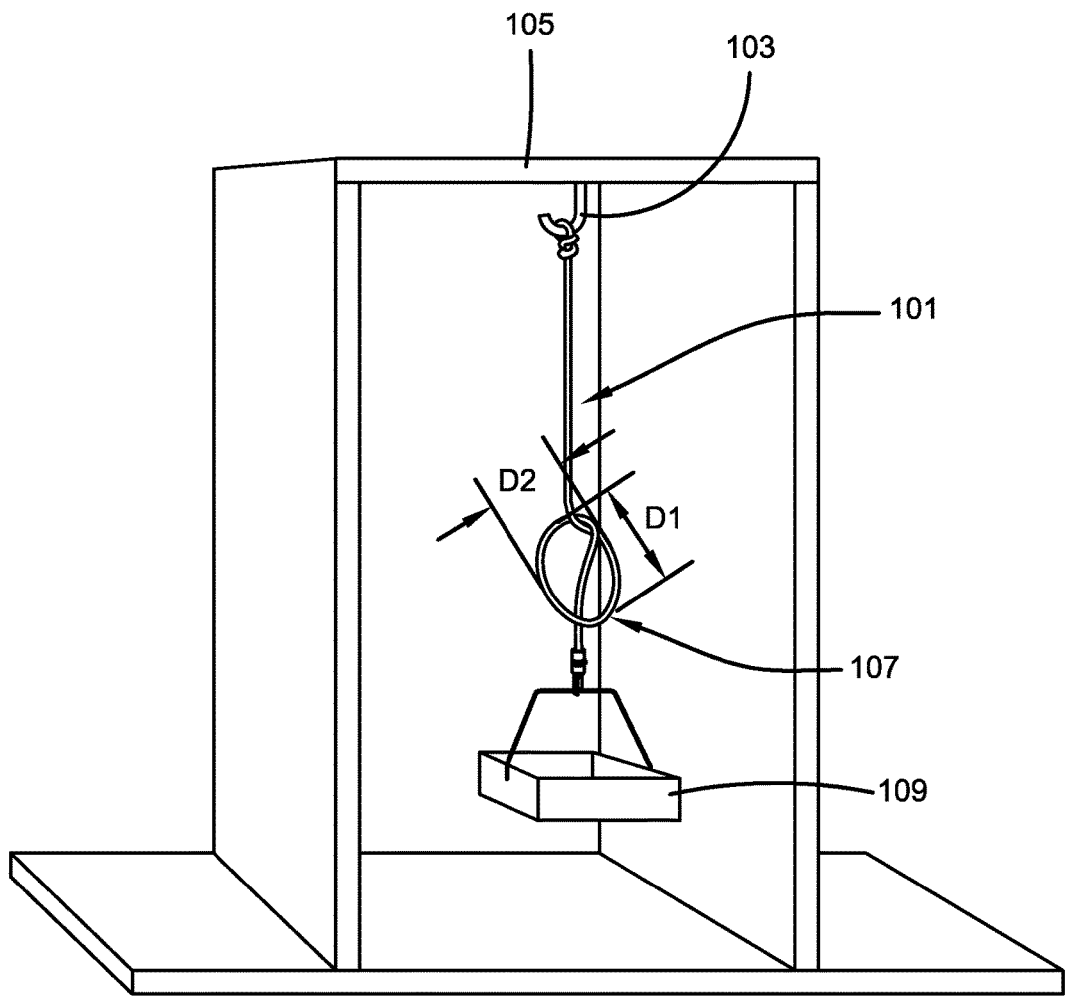
FIG. 10 is an illustration of the test method used in Examples 2-4.
Figure 11:
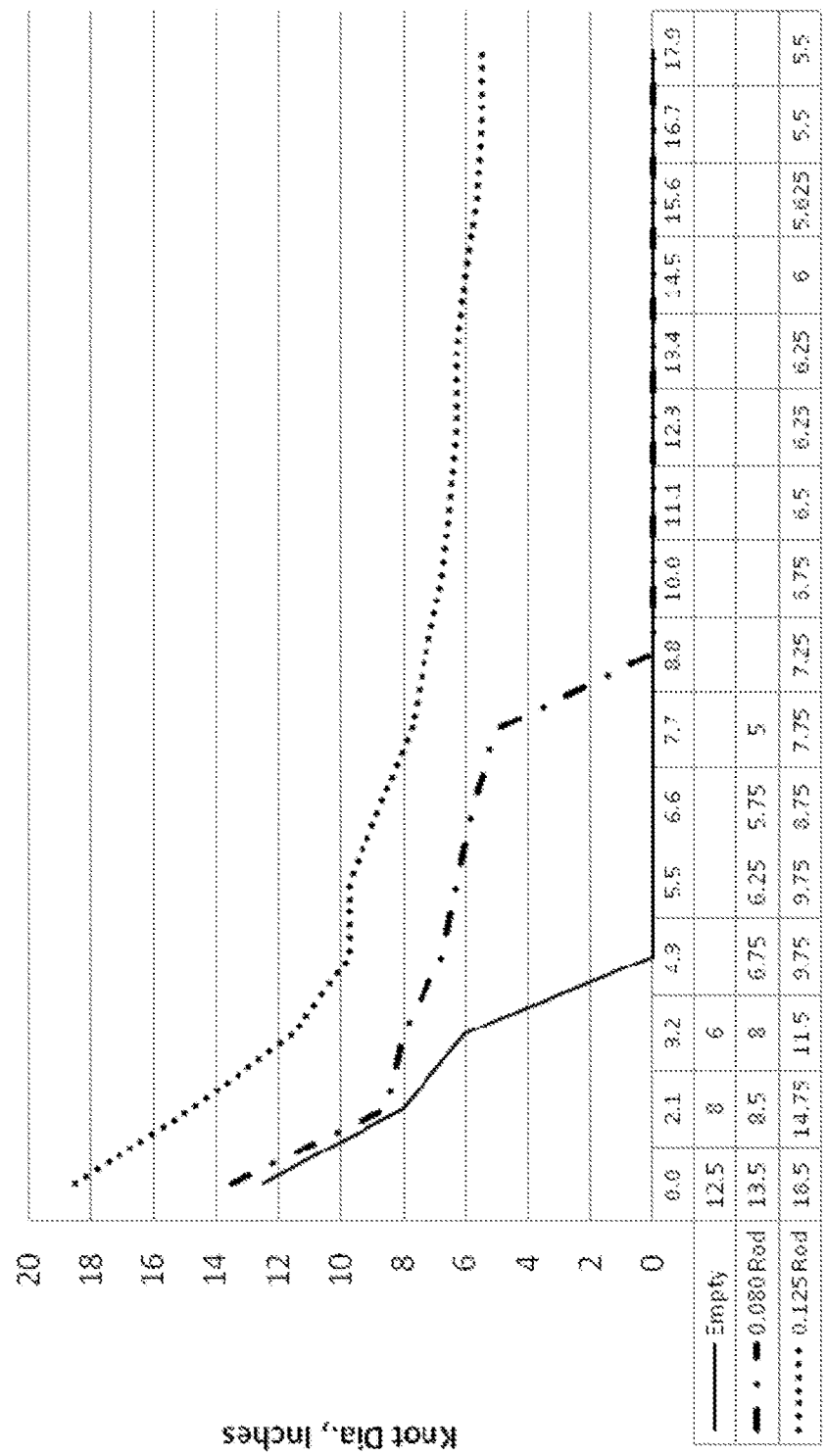
FIG. 11 is a graph showing the results of the tests in Examples 2-4.

A seven foot length of tube (or stiffened tube) 101 was used and secured on a hook 103 coupled to a station frame 105 at one end about 5 ft above the floor. As shown in FIG. 10, a loose knot loop 107 was then formed in the free hanging length, and a load basket 109 was attached at the bottom end of the tube 101. The loose knot loop 107 was observed for what the no-load loop diameters D1 and D2 were. (The average knot diameter was calculated by adding the D1 and D2 and dividing by 2.) A series of increasing weights was then added to the load basket 109 to contribute a drawing tension to the loose knot loop 107. The average diameter of the loose knot loop 107 was measured with every addition of weight until kinking of the tube 101 occurred. The results of the test in a graph of the behavior is shown in FIG. 11.

The data shows that as the Example 2 empty tube is tensioned, it quickly pulled down from its resting diameter of 12.5 inches into a smaller and smaller diameter loop. At only 3.2 pounds of draw tension, the loop diameter was approaching 6 inches and the tube was visibly ovalizing at an increasing rate such that the tube kinked in less than 30 seconds of having assumed the load. Once the tube has kinked, its resistance to permanent knot formation has been eliminated and it cannot withdraw from the knot under its own power.

By contrast, the Example 3 (0.080 inch) rod insert had little influence on the tube under low tension conditions, as its resting diameter was a very similar 13.5 inches. However, it required over twice the tension load to affect a similar synched diameter and ovalization of the tube. It should also be noted that when an empty tube reaches its critical buckling radius the kink is catastrophic, and the bend angle so formed between the two adjacent legs approaches 90 degrees or more—this is why it cannot recover on its own. Because the rigid insert does not buckle inside the tube, it continues to support the tube in a smooth rounded transition even after the tube has kinked. For this reason, recovery from the knot is still possible once the tension force is removed (assuming the rod is stiff enough to overcome the frictional resistance found between the two tube ends of the knot). With the 0.080 inch rod, ovalization began at a loop diameter of 5.75 inches as contrasted to 6.25 inches in the case if the empty tube; and kinking did not occur until a 5 inch diameter was reached. Removing the weights saw the rod push back against the knot, allowing the loop diameter to open again, but the kink in the tube did not allow compete recovery without a small push.

The Example 4 (0.125 inch) rod on the other hand was much stiffer and resistive to knot formation. Its initial resting diameter was 18.5 inches. A significant amount of weights were added to this loop in an attempt to get it to kink, however, even with nearly 18 pounds of load, and a loop diameter of 5.5 inch, ovalization was not near the level required for kinking. The graph suggests that so long as the rod did not buckle, the Example 4 tube assembly became nearly asymptotic in behavior, taking on more and more tension load, but with no significant reduction in knot diameter. It was also surprising that once the load was removed the loop opened up completely without any aid. Thus, the Example 4 tube assembly was relatively flexible to formation of large diameter loops, and also resisted being drawn into tighter knot-forming loops. Furthermore, upon formation of a loop, it has the ability to recover from such formations under its own power.

It is claimed:

1. An oil skimmer system comprising:
   a tube;
   a mechanical drive system configured to drive the tube in a continuous loop; and
   a scraper configured to skim an outer surface of the tube;
   the tube comprising an elongated, hollow structure, having an inner surface bounding a hollow portion of the tube, and an outer surface defining an exterior surface of the tube;
   an elongated stiffening member disposed within the hollow portion of the tube that extends the length of the tube, the stiffening member having a stiffness at least 0.5 times that of the tube;
   wherein the tube is joined in a looped configuration.

2. The oil skimmer system of claim 1, further comprising a hollow wound spiral spring body coupling first and second ends of the elongated stiffening member.

3. The oil skimmer system of claim 2, wherein the hollow wound spiral spring body coupling comprises:
   a slideable side and a fixed side, the slideable side and the fixed side each coupled to a mid-section;
   the slideable side having an inner diameter defining a first inner diameter cross-sectional area;
   the fixed side having an inner diameter defining a second inner diameter cross-sectional area;
   the mid-section comprising an inner diameter cross-sectional area that at least equals a sum of the first and second inner diameter cross-sectional areas;
   wherein the first end of the elongated stiffening member is inserted in the slideable side and the second end of the elongated stiffening member is inserted in the fixed side.

4. The oil skimmer system of claim 1, wherein the tube and the stiffening member have cross-sectional dimensions that allow for the stiffening member to move about inside the inner surface of the tube.

5. The oil skimmer system of claim 1, wherein the outer surface of the tube is oleophilic.

6. The oil skimmer system of claim 1, wherein the tube is configured to be buoyant in water.

7. The oil skimmer system of claim 1, wherein the elongated stiffening member is 0.5 times to 10 times the stiffness of the tube, as determined by a cantilever test with no additional loading with a 3 ft. test length.

8. The oil skimmer system of claim 1, wherein the elongated stiffening member has a stiffness of 3 times to 5 times the stiffness of the tube, as determined by a cantilever test with no additional loading with a 1 ft. test length.

9. The oil skimmer system of claim 1, wherein the tube has an outer diameter of 0.25 inches to 4 inches.

10. The oil skimmer system of claim 1, wherein the elongated stiffening member has a cross-sectional dimension that is 1% to 30% of a diameter of the hollow portion of the tube.

11. The oil skimmer system of claim 1, wherein the elongated stiffening member comprises a linear reinforcing material and a thermoplastic or thermosetting resin.

12. The oil skimmer system of claim 1, wherein the tube has an outer diameter to wall thickness ratio of 5 to 20.

13. A hollow, spiral wound spring body comprising:
a first side and a second side, the first side and the second side each coupled to a mid-section;
the first side having an inner diameter defining a first inner diameter cross-sectional area;
the second side having an inner diameter defining a second inner diameter cross-sectional area;
the mid-section comprising an inner diameter cross-sectional area that at least equals a sum of the first and second inner diameter cross-sectional areas;
wherein the first side is configured to receive an elongated member, and the second side is configured to receive an elongated member;
wherein the first side is on an opposite axial end of the mid-section than the second side, and a center of the first side inner diameter is not axially aligned with a center of the second side inner diameter.

14. The hollow, spiral wound spring body of claim 13, wherein the first inner diameter cross-sectional area is greater than the second inner diameter cross-sectional area.

15. The hollow, spiral wound spring body of claim 14, wherein a sleeve is contained in one or both of the slideable or fixed sides.

16. The hollow, spiral wound spring body of claim 13, wherein the mid-section has a substantially oval cross-section, and the first side and second side have a substantially round cross-section.

* * * * *